United States Patent
Kuroda et al.

(12)
(10) Patent No.: US 6,783,788 B2
(45) Date of Patent: Aug. 31, 2004

(54) SEASONING COMPOSITIONS, FOODS CONTAINING SUCH A SEASONING COMPOSITION, AND PROCESS FOR PREPARING SUCH FOODS

(75) Inventors: Motonaka Kuroda, Kawasaki (JP); Toshihito Seki, Tokyo (JP); Akira Okuaki, Kawasaki (JP)

(73) Assignee: Ajinomoto Co., Inc., Tokyo (JP)

( * ) Notice: Subject to any disclaimer, the term of this patent is extended or adjusted under 35 U.S.C. 154(b) by 238 days.

(21) Appl. No.: 10/067,879

(22) Filed: Feb. 8, 2002

(65) Prior Publication Data

US 2002/0187243 A1 Dec. 12, 2002

(30) Foreign Application Priority Data

Feb. 9, 2001 (JP) ........................................ 2001-033650

(51) Int. Cl.⁷ ................................................. A23L 1/22
(52) U.S. Cl. ...................... 426/534; 426/648; 426/649; 426/650
(58) Field of Search ................................ 426/533, 534, 426/638, 648, 649, 650, 804, 806

(56) References Cited

U.S. PATENT DOCUMENTS 4,243,691 A * 1/1981 Mohlenkamp et al. ...... 426/649

FOREIGN PATENT DOCUMENTS

| EP | 0 059 363 | | 9/1982 |
| EP | 0 125 021 | | 11/1984 |
| JP | 57138359 | A | 8/1982 |
| JP | 59187761 | A | 10/1984 |
| JP | 62-003758 | * | 1/1987 |
| JP | 06007111 | A | 1/1994 |
| JP | 11187841 | A | 7/1999 |

OTHER PUBLICATIONS

Anonymous, Research Disclosure, vol. 207, No. 29, pp. 262–263, XP–007107909, "Sodium–Free Salt Substitiute", Jul. 1981.
Patent Abstracts of Japan, JP 62–032855, Feb. 12, 1987.
Patent Abstracts of Japan, JP 11–290017, Oct. 26, 1999.
Patent Abstracts of Japan, JP 59–055165, Mar. 30, 1984.

* cited by examiner

*Primary Examiner*—Leslie Wong
(74) *Attorney, Agent, or Firm*—Oblon, Spivak, McClelland, Maier & Neustadt, P.C.

(57) ABSTRACT

Seasoning compositions, which comprise 100 parts by weight of potassium chloride, 0.2 to 5 parts by weight of a sugar alcohol, 1 to 7.5 parts by weight of monosodium glutamate, 1 to 10 parts by weight of sucrose, and 0.05 to 1 part by weight of sodium inosinate and/or sodium guanylate, are useful as table salt (sodium chloride) replacers and can be used to reduce the amount of sodium chloride, while at the same time imparting a good salty taste to food.

20 Claims, No Drawings

SEASONING COMPOSITIONS, FOODS CONTAINING SUCH A SEASONING COMPOSITION, AND PROCESS FOR PREPARING SUCH FOODS

CROSS REFERENCES TO RELATED APPLICATIONS

This application claims priority to Japanese Patent Application No. 33650/2001, filed on Feb. 9, 2001, and which is incorporated herein by reference in its entirety.

BACKGROUND OF THE INVENTION

1. Field of the Invention

The present invention relates to seasoning compositions, which can impart a good salty taste to food and reduce the amount of sodium chloride in the food. The present invention also relates to foods, which contain such a seasoning composition. The present invention further relates to processes for preparing foods having a good taste even when the amount of sodium chloride in the food is reduced.

2. Discussion of the Background

While table salt (sodium chloride) has been widely utilized as a basic seasoning agent for cooking food, it is known that the excessive intake of salt has a bad influence upon diseases of the circulatory system such as hypertension, heart disease, and the like.

Although an attempt to utilize potassium chloride as a salt-replacer or salt substitute has been made, the use of potassium chloride as a salt-replacer is not completely satisfactory owing to its stimulative bitter taste.

In order to solve the above-noted problem with the use of potassium chloride as a salt-replacer, there have been reported processes for mitigating the bitter taste of potassium chloride by incorporating into the potassium chloride one or more substances selected from among glutamate, an amino acid, salt of an organic acid, a nucleic acid seasoning substance and a sweetener having a high degree of sweetness such as glycyrrhizin (see Japanese Patent Application Laid-Open Nos. 138359/1982, 187761/1984, 7111/1994, and 187841/1999). However, the undesirable bitter taste and harsh taste of potassium chloride per se as stated above could not be sufficiently mitigated by these prior art technologies.

SUMMARY OF THE INVENTION

Accordingly, it is one object of the present invention to provide a seasoning composition which can mitigate the peculiar bitter taste and harsh taste of potassium chloride and which can impart a good salty taste to food with a reduced amount of table salt (sodium chloride).

It is another object of the present invention to provide foods, which have a good salty taste and a low content of sodium chloride.

It is another object of the present invention to provide a process for preparing such foods.

These and other objects, which will become apparent during the following detailed description, have been achieved by the inventors' discovery that the peculiar bitter taste and harsh taste of potassium chloride can be mitigated by incorporating a sugar alcohol and sucrose together with sodium glutamate and a nucleic acid seasoning substance into potassium chloride in a specific ratio.

DETAILED DESCRIPTION OF THE PREFERRED EMBODIMENTS

Thus, in a first embodiment, the present invention provides a seasoning composition which can reduce the amount of sodium chloride and imparts a good salty taste to food and which comprises:

(a) 100 parts by weight of potassium chloride;

(b) 0.2 to 5, preferably 0.3 to 3.5, parts by weight of a sugar alcohol;

(c) 1 to 7.5, preferably 2 to 5, parts by weight of sodium glutamate (in terms of sodium glutamate anhydride);

(d) 1 to 10, preferably 2 to 5, parts by weight of sucrose; and (b) 0.05 to 1, preferably 0.1 to 0.5, part by weight of sodium inosinate and/or sodium guanylate (in terms of anhydride).

The seasoning composition of the present invention may exist in powdery, granular, or liquid form as well as in food cooked with this seasoning composition.

As the potassium chloride for use in the present invention, there may be used any purified potassium chloride in any form of powder, granule, or liquid. Also, potassium chloride-containing materials such as bittern formed as a by-product during the purification of sodium chloride from seawater may be used.

Examples of the sugar alcohol for use in the present invention include sorbitol, maltitol, palatinitol, mannitol, xylitol, and hydrogenated materials derived from the partial decomposition product of starch. These sugar alcohols may be used singly or as mixtures of two or more of kinds. Also, a food such as an extract containing a high concentration of sugar alcohol as stated above may be used. A specific example of such an extract is the extract of tangle weed.

As the sodium glutamate for use in the present seasoning compositions, usually the monohydrate crystal is used. However, there may be also used an anhydride derived from the monohydrate by drying. In addition, a food material containing a high concentration of sodium glutamate may also be used. Specific examples of such a food material include hydrolyzed vegetable protein, hydrolyzed animal protein, soy sauce, and the like.

As the sucrose, granulated sugar, refined sugar, soft sugar (yellow sugar), raw sugar (brown sugar), and the like may be used. Also, a raw material such as molasses containing sucrose may be used.

As the sodium inosinate, usually the 7.5 hydrate may be used. There may also be used an anhydride derived from the 7.5 hydrate by drying. Also, a food material containing a high concentration of sodium inosinate may be used. A specific example of such a food material is yeast extract. Similarly, sodium guanylate may be usually used in the form of the 7.5 hydrate. There may also be used an anhydride derived from the 7.5 hydrate by drying. In addition, a food material containing a high concentration of sodium guanylate may be used. Specific examples of such a food material include yeast extract and shiitake mushroom extract. Among the compositions of the present invention, the improvement of the bitter taste of potassium chloride is particularly increased by the addition of sodium inosinate.

In this connection, as to the exact concentration and amount at which the sugar alcohol, sodium glutamate, sucrose, sodium inosinate and/or sodium guanylate are blended for preparing a seasoning composition which can reduce the amount of sodium chloride and impart a good salty taste to food as well as for preparing a food having a low content of sodium chloride and a good salty taste, it may be varied depending on the kind of food and beverage to be added. However, the optimum concentration and amount of the composition may be easily determined by the simple trial test before use.

The present seasoning compositions may be prepared by simply blending:

(a) 100 parts by weight of potassium chloride;
(b) 0.2 to 5, preferably 0.3 to 3.5, parts by weight of a sugar alcohol;
(c) 1 to 7.5, preferably 2 to 5, parts by weight of sodium glutamate (in terms of sodium glutamate anhydride);
(d) 1 to 10, preferably 2 to 5, parts by weight of sucrose; and
(e) 0.05 to 1, preferably 0.1 to 0.5, part by weight of sodium inosinate and/or sodium guanylate (in terms of anhydride).

Components (a)–(e) may be blended by any conventional means and with any conventional apparatus. For example, seasoning compositions which are in the liquid from may be prepared by simply dissolving or suspending components (a) through (e) in the appropriate relative amounts in an aqueous liquid. Examples of suitable aqueous liquids include water and alcohol-water mixtures. Depending on the concentrations of components (a) through (e) in the aqueous solution, it may be necessary or desirable to heat the mixture to dissolve the components. The components (a) through (e) may be added in any order to the aqueous liquid.

Seasoning compositions which exist in the dry state, such as powders or granules, may be prepared by either mixing or blending components (a) through (e) in the dry state. The dry blending or mixing may be carried out in any conventional suitable apparatus, such as a ball mill or a drum mill.

Seasoning compositions which exist in the dry state may be alternatively prepared by first forming a solution or suspension of components (a) through (e) and then drying the solution or suspension. The preparation of the solution or suspension of components (a) through (e) may be carried out as described above in the context of preparing the liquid seasoning compositions. The thus-prepared solution or suspension may then be dried using any conventional suitable apparatus, such as a rotary drier, a drum drier, or a fluidized bed drier.

The present seasoning compositions may then be packaged as is or may be combined with a food, as described below. The present seasoning composition may be packaged in bulk, in which the package contains more seasoning composition than would typically be used for a single dish or serving of food. Such bulk packages would typically contain the seasoning composition in an amount ranging from 10 grams to 10 kilograms, more typically 100 grams to 5 kilograms. Such bulk packages can be in the form of paper, plastic, or cloth bags or cardboard boxes or drums. Such bulk packages may be fitted with plastic or metal spouts to facilitate the dispensing of the seasoning compositon.

Alternatively, the present seasoning composition may be packaged in an amount which would be suitable for use at a single meal or with a single serving of food. In this case, the package will contain the seasoning composition in an amount of 0.1 gram to 10 grams, more typically about 1 gram to 5 grams. Suitable packaging materials for such individual serving packages include paper or foil packets or pouches.

In a second embodiment, the present invention provides a food having a low content of sodium chloride and a good salty taste, wherein said food has been seasoned with a seasoning composition comprising:

(a) 100 parts by weight of potassium chloride;
(c) 0.2 to 5, preferably 0.3 to 3.5, parts by weight of a sugar alcohol;
(d) 1 to 7.5, preferably 2 to 5, parts by weight of sodium glutamate (in terms of sodium glutamate anhydride);
(e) 1 to 10, preferably 2 to 5, parts by weight of sucrose; and
(f) 0.05 to 1, preferably 0.1 to 0.5, part by weight of sodium inosinate and/or sodium guanylate (in terms of anhydride).

Examples of foods which may be seasoned with the present seasoning composition include any foods to which table salt (sodium chloride) is added to enhance the flavor. Such foods include meats (including raw, cooked, and dried meats), vegetables (including raw, pickled, cooked, and dried vegetables), fruits (including raw, cooked, and dried fruits), grains (including dried cereals and breads), prepared foods (such as dried, canned or jarred sauces and soups) and snack foods. In a particularly preferred embodiment, the present seasoning composition is used to replace all or a portion of the sodium chloride which is typically added to a snack food to enhance its flavor. Examples of such snack foods include potato chips, corn chips, and pretzels.

Typically, the seasoning composition of the present invention will be added to the food in approximately the same weight amount as the sodium chloride which is being replaced, i.e., the present seasoning composition may be used as a one-to-one replacer for sodium chloride. Thus, if a food product is typically seasoned with 1 gram of table salt (sodium chloride), the sodium chloride in this food product may be completely replaced with about 1 gram of the seasoning composition of the present invention. Alternatively, it may be desired to replace only a portion of the sodium chloride with a corresponding amount of the seasoning composition of the present invention. The amounts of sodium chloride conventionally used to season various food products are well known to those of skill in the art and need not be recited.

Other features of the invention will become apparent in the course of the following descriptions of exemplary embodiments, which are given for illustration of the invention and are not intended to be limiting thereof.

EXAMPLES

The following Experimental Examples and Examples illustrate the preparation of a seasoning composition which can reduce the amount of salt and impart a good salty taste to food, and the preparation of food having a low content of sodium chloride and a good salty taste and the effect to be achieved. The present invention is not limited to the Experimental Examples and Examples.

Experimental Example 1

A variety of sample solutions were prepared according to the formulations shown in table 1 (the quantity of the respective sample solutions was adjusted to 100 ml for evaluation). Sensory evaluation was carried out by five taste panelists. The results are shown in table 1. The strength of the bitter taste for a 1 weight % sodium chloride solution sample was scored as – (no bitter taste is recognized), while the strength of the bitter taste for a 1% sodium potassium solution sample was scored as ++++ (a very strong bitter taste is recognized). Thus, the evaluation with respect to the strength of the bitter taste was scored over a 5-grade evaluation of from – to ++++. Also, the evaluation with respect to the preference of salty taste was made over a similar 5-grade evaluation of from – to ++++.

In this case, "AJINOMOTO" (a trade name, a product of Ajinomoto Co., Inc.) was used as the sodium glutamate (hereinafter, referred to as "MSG"). Also, "IN (TRI)" (a trade name, a product of Ajinomoto Co., Inc. sodium inosinate 7.5 hydrate) was used as the sodium inosinate.

As shown in table 1, in order to mitigate the bitter taste of potassium chloride solution, the addition of sugar alcohol (sorbitol), sodium glutamate, sucrose, and sodium inosinate thereto is essential. It is also understood from the results in table 1 that the inherent bitter taste of potassium chloride solution may be efficiently mitigated by incorporating therein 0.2–5 parts by weight of a sugar alcohol, 1–7.5 parts by weight of monosodium glutamate (in terms of anhydride), 1–10 parts by weight of sucrose, and 0.05–1 part by weight of sodium inosinate (in terms of anhydride) per 100 parts by weight of potassium chloride (dry basis).

TABLE 1

| Sample | KCl | MSG | Sorbitol | Sucrose | IN | Salty taste | Bitter taste | Preference of salty taste |
|---|---|---|---|---|---|---|---|---|
| Control | 1000 | 0 | 0 | 0 | 0 | +++ | ++++ | − |
| 1 | 1000 | 30 | 10 | 30 | 0 | +++ | ++++ | − |
| 2 | 1000 | 30 | 10 | 0 | 2 | +++ | ++++ | − |
| 3 | 1000 | 30 | 0 | 30 | 2 | +++ | ++++ | − |
| 4 | 1000 | 0 | 10 | 30 | 2 | +++ | ++++ | − |
| 5 | 1000 | 3 | 10 | 30 | 2 | +++ | ++++ | − |
| 6 | 1000 | 6 | 10 | 30 | 2 | +++ | +++ | − |
| 7 | 1000 | 12 | 10 | 30 | 2 | +++ | ++ | + |
| 8 | 1000 | 18 | 10 | 30 | 2 | +++ | + | +++ |
| 9 | 1000 | 24 | 10 | 30 | 2 | +++ | + | +++ |
| 10 | 1000 | 30 | 10 | 30 | 2 | +++ | + | +++ |
| 11 | 1000 | 40 | 10 | 30 | 2 | +++ | + | +++ |
| 12 | 1000 | 50 | 10 | 30 | 2 | +++ | + | ++ |
| 13 | 1000 | 70 | 10 | 30 | 2 | +++ | + | + |
| 14 | 1000 | 120 | 10 | 30 | 2 | +++ | + | + |
| 15 | 1000 | 30 | 1 | 30 | 2 | +++ | +++ | − |
| 16 | 1000 | 30 | 2 | 30 | 2 | +++ | ++ | + |
| 17 | 1000 | 30 | 4 | 30 | 2 | +++ | + | +++ |
| 18 | 1000 | 30 | 6 | 30 | 2 | +++ | + | +++ |
| 19 | 1000 | 30 | 10 | 30 | 2 | +++ | + | +++ |
| 20 | 1000 | 30 | 15 | 30 | 2 | +++ | + | +++ |
| 21 | 1000 | 30 | 20 | 30 | 2 | +++ | + | +++ |
| 22 | 1000 | 30 | 30 | 30 | 2 | +++ | + | +++ |
| 23 | 1000 | 30 | 50 | 30 | 2 | +++ | + | ++ |
| 24 | 1000 | 30 | 100 | 30 | 2 | +++ | + | + |
| 25 | 1000 | 30 | 10 | 2 | 2 | +++ | +++ | − |
| 26 | 1000 | 30 | 10 | 4 | 2 | +++ | ++ | + |
| 27 | 1000 | 30 | 10 | 10 | 2 | +++ | ++ | +++ |
| 28 | 1000 | 30 | 10 | 20 | 2 | +++ | + | +++ |
| 29 | 1000 | 30 | 10 | 30 | 2 | +++ | + | +++ |
| 30 | 1000 | 30 | 10 | 40 | 2 | +++ | + | +++ |
| 31 | 1000 | 30 | 10 | 50 | 2 | +++ | + | ++ |
| 32 | 1000 | 30 | 10 | 75 | 2 | +++ | + | + |
| 33 | 1000 | 30 | 10 | 100 | 2 | +++ | + | + |
| 34 | 1000 | 30 | 10 | 30 | 0.1 | +++ | +++ | − |
| 35 | 1000 | 30 | 10 | 30 | 0.2 | +++ | +++ | + |
| 36 | 1000 | 30 | 10 | 30 | 0.4 | +++ | +++ | + |
| 37 | 1000 | 30 | 10 | 30 | 0.8 | +++ | ++ | +++ |
| 38 | 1000 | 30 | 10 | 30 | 1.2 | +++ | + | +++ |
| 39 | 1000 | 30 | 10 | 30 | 2 | +++ | + | +++ |
| 40 | 1000 | 30 | 10 | 30 | 4 | +++ | + | +++ |
| 41 | 1000 | 30 | 10 | 30 | 8 | +++ | + | ++ |
| 42 | 1000 | 30 | 10 | 30 | 12 | +++ | + | + |

(Unit: mg/dl)

Experimental Example 2

Next, a series of experiments were conducted varying the kind of sugar alcohol. The evaluation was made by adding a variety of samples of sugar alcohol to a 1 weight % sodium potassium solution according to a similar manner as in Experimental Example 1. The sensory evaluation was also made in a similar manner as in Experimental Example 1. The results of the evaluation are shown in table 2. Although a slight difference in the strength of the bitter taste was recognized depending on the kind of sugar alcohol used, it was found that all of sugar alcohols tested exhibited the effect of mitigating the bitter taste.

TABLE 2

| Sample | Sugar alcohol (Concentration:mg/dl) | Salty taste | Bitter taste | Preference of salty taste |
|---|---|---|---|---|
| 1 | Sorbitol (10) | +++ | + | +++ |
| 2 | Maltitol (10) | +++ | ++ | ++ |
| 3 | Maltitol (20) | +++ | + | +++ |
| 4 | Mannitol (10) | +++ | + | +++ |
| 5 | Mannitol (20) | +++ | + | +++ |
| 6 | Xylitol (10) | +++ | ++ | ++ |
| 7 | Xylitol (20) | +++ | + | +++ |
| 8 | Palatinitol (10) | +++ | ++ | ++ |
| 9 | Palatinitol (20) | +++ | + | +++ |
| 10 | Lactitol (10) | +++ | ++ | ++ |
| 11 | Lactitol (20) | +++ | + | +++ |
| 12 | "TA-50"[1] (20) | +++ | + | +++ |
| 13 | "TA-50" (40) | +++ | + | +++ |

[1]"TA-50": hydrogenated material derived from the decomposition product of starch (a product of Towa Chemical Industry Co., Ltd.)

Each of Sample Nos. 1–13 contains 1 weight % of KCl, 30 mg/dl of MSG, 30 mg/dl of sucrose and 2 mg/dl of IN.

Experimental Example 3

Next, a series of experiments was conducted by varying the kind of saccharide. The evaluation was made by adding a variety of samples to a 1 weight % sodium potassium solution according to a similar manner as in Experimental Example 1. The sensory evaluation was also made in a similar manner as in Experimental Example 1. The results of the evaluation are shown in table 3. Among the tested saccharides, especially sucrose has been found to exhibit the effect of mitigating the bitter taste of potassium chloride.

TABLE 3

| Sample | Saccharide (Concentration:mg/dl) | Salty taste | Bitter taste | Preference of salty taste |
|---|---|---|---|---|
| 1 | Sucrose (30) | +++ | + | +++ |
| 2 | Glucose (30) | +++ | ++ | ++ |
| 3 | Glucose (60) | +++ | ++ | ++ |
| 4 | Fructose (30) | +++ | ++ | ++ |
| 5 | Fructose (60) | +++ | ++ | ++ |
| 6 | Galactose (30) | +++ | ++ | ++ |
| 7 | Galactose (60) | +++ | ++ | ++ |
| 8 | Lactose (30) | +++ | ++ | ++ |
| 9 | Lactose (60) | +++ | ++ | ++ |
| 10 | Trehalose (30) | +++ | ++ | +++ |
| 11 | Trehalose (60) | +++ | ++ | +++ |
| 12 | Xylose (30) | +++ | ++ | ++ |
| 13 | Xylose (60) | +++ | ++ | ++ |

Each of Sample Nos. 1–13 contains 1 weight % of KCl, 30 mg/dl of MSG, 10 mg/dl of sorbitol and 2 mg/dl of IN.

Experimental Example 4

Next, a series of experiments was conducted by varying the kind of nucleic acid salt. The evaluation was made by adding a variety of samples to a 1 weight % sodium potassium solution according to a similar manner as in Experimental Example 1. The sensory evaluation was also made in a similar manner as in Experimental Example 1. The results of the evaluation are shown in table 4. Among the tested nucleic acid salts, especially sodium inosinate and sodium guanylate have been found to exhibit the effect of mitigating the bitter taste of potassium chloride.

TABLE 4

| Sample | Nucleic acid (Concentration: mg/dl) | Salty taste | Bitter taste | Preference of salty taste |
|---|---|---|---|---|
| 1 | Sodium inosinate (2) | +++ | + | +++ |
| 2 | Sodium guanylate (1) | +++ | +++ | + |
| 3 | Sodium guanylate (2) | +++ | ++ | + |
| 4 | Sodium guanylate (4) | +++ | ++ | + |
| 5 | Sodium adenylate (2) | +++ | +++ | + |
| 6 | Sodium adenylate (4) | +++ | +++ | + |
| 7 | Sodium adenylate (12) | +++ | ++ | ++ |

Each of Sample Nos. 1–7 contains 1 weight % of KCl, 30 mg/dl of MSG, 30 mg/dl of sucrose and 10 mg/dl of sorbitol.

Example 1

100 Grams of potassium chloride, 3.0 g of sodium glutamate "AJINOMOTO" (a trade name, a product of Ajinomoto Co., Inc.), 1.5 g of sorbitol powder, 2.0 g of sugar, and 0.2 g of sodium inosinate "IN (TRI)" (a trade name, a product of Ajinomoto Co., Inc.) were pulverized and mixed together to obtain a seasoning powder of the present invention.

A taro cooked with the obtained seasoning powder (Test group 3) was prepared. A seasoning powder and seasoning solution were put in a cooking pan according to the formulation shown in table 5 and heated. After boiling, frozen Japanese taro (sato-imo) was added thereto. After boiling again, the heating was continued for 15 minutes to prepare a cooked Japanese taro. In this connection, there was similarly prepared Japanese taro cooked with sodium chloride (Test group 1) as well as sodium potassium (Test group 2) in place of the seasoning powder of the present invention, and a comparison evaluation was made with ten panels. The evaluation was conducted using a 5-grade evaluation of from −2 (very weak or not very preferable) to +2 (very strong or very preferable). The results of sensory evaluation are shown in table 6.

While the cooked taro of the present invention (Test group 3) is slightly inferior in regard to the preference of the whole taste and flavor in comparison with that of the sodium chloride-using group (Test group 1), Test group 3 proved to have a significantly appreciable mitigation effect on the bitter taste and harsh taste of potassium chloride and received a higher score for the preference of the whole taste and flavor in comparison with the taro cooked with the sodium/potassium chloride-using group (Test group 2). These results show that there can be provided a cooked product having a good taste even when the amount of sodium chloride is reduced.

TABLE 5

| Sample | Test group 1 (NaCl-using group) | Test group 2 (KCl/NaCl-using group) | Test group 3 (Seasoning agent of the present invention-using group) |
|---|---|---|---|
| Taro (frozen) | 400 g | 400 g | 400 g |
| Soup stock of dried & smoked skipjack (katsuo-bushi)*[2] | 40 | 40 | 40 |
| Sweet sake | 4 | 4 | 4 |
| Sugar | 14 | 14 | 14 |
| Soy sauce (koi-kuchi: dark color type) | 8 | 8 | 8 |
| Japanese sake | 12 | 12 | 12 |
| NaCl | 5.2 | 2 | 2 |
| KCl | — | 5.6 | — |
| Seasoning agent of the present invention | — | — | 5.8 |
| Water | 316.8 | 314.4 | 314.2 |

*[2]"Hon-dukuri Ichibandashi-katsuo" (a trade name, a product of Ajinomoto Co., Inc.)

TABLE 6

| Evaluation item (−2 to +2 points) | Test group 1 (NaCl-using group) | Test group 2 (KCl/NaCl-using group) | Test group 3 (Seasoning agent of the present invention-using group) |
|---|---|---|---|
| Strength of salty taste | 1.33 | 1.00 | 1.00 |
| Preference of salty taste | 1.33 | −0.83 | 0.50 |
| Strength of bitter taste | −0.50 | 1.00 | 0.50 |
| Strength of harsh taste | −0.33 | 1.33 | 0.50 |
| Preference of flavor | 1.00 | −0.83 | 0.67 |
| Preference of the whole taste | 1.17 | −0.67 | 0.67 |

Example 2

A Japanese-style noodle soup was prepared using the seasoning powder obtained in Example 1 (Test group 3). According to the formulation shown in table 7, a seasoning powder and seasoning solution were mixed to prepare a variety of noodle soup samples. In this connection, there were similarly prepared noodle soup using sodium chloride (Test group 1) as well as potassium chloride (Test group 2) in place of the seasoning powder of the present invention (Test group 3), and the comparison evaluation was made with ten taste panelists. The evaluation was conducted over a 5-grade evaluation of from −2 (very weak or not very preferable) to +2 (very strong or very preferable). The results of sensory evaluation are shown in table 8.

While the noodle soup of the present invention (Test group 3) is slightly inferior in the preference of the whole taste and flavor in comparison with that of sodium chloride-using group (Test group 1), it was proved to have a significantly appreciable mitigation effect on the bitter taste and harsh taste of potassium chloride alone and received a higher score for the preference of the whole taste and flavor in comparison with that of sodium/potassium chloride-using group (Test group 2). These results show that there can be provided soups having a good taste even when the amount of sodium chloride is reduced.

TABLE 7

| Sample | Test group 1 (NaCl-using group) | Test group 2 (KCl/NaCl-using group) | Test group 3 (Seasoning agent of the present invention-using group) |
|---|---|---|---|
| Soy sauce (koi-kuchi: dark color type) | 15 g | 15 g | 15 g |
| Sweet sake | 2 | 2 | 2 |

TABLE 7-continued

| Sample | Test group 1 (NaCl-using group) | Test group 2 (KCl/NaCl-using group) | Test group 3 (Seasoning agent of the present invention-using group) |
|---|---|---|---|
| Sugar | 3 | 3 | 3 |
| Soup stock of dried & smoked skipjack and kelp*3 | 100 | 100 | 100 |
| NaCl | 9.5 | 2 | 2 |
| KCl | — | 10.5 | — |
| Seasoning agent of the present invention | — | — | 10.9 |
| Water (warm water) | 900 | 900 | 900 |

*3"Hon-dukuri Ichibandashi-Katsuo & Kombu" (a trade name, a product of Ajinomoto Co., Inc.)

TABLE 8

| Evaluation item (−2 to +2 points) | Test group 1 (NaCl-using group) | Test group 2 (KCl/NaCl-using group) | Test group 3 (Seasoning agent of the present invention-using group) |
|---|---|---|---|
| Strength of salty taste | 1.00 | 0.83 | 0.67 |
| Preference of salty taste | 1.33 | −0.67 | 0.45 |
| Strength of bitter taste | −1.00 | 1.17 | −0.33 |
| Strength of harsh taste | −1.33 | 1.33 | −0.50 |
| Preference of flavor | 1.17 | −0.50 | 0.67 |
| Preference of the whole taste | 1.00 | −0.50 | 0.50 |

Example 3

50 Grams of sodium chloride, 50 g of potassium chloride, 1.5 g of sodium glutamate "AJINOMOTO" (a trade name, a product of Ajinomoto Co., Inc.), 1.0 g of sorbitol powder, 1.0 g of sugar (granulated sugar), and 0.1 g of sodium inosinate "IN (TRI)" (a trade name, a product of Ajinomoto Co., Inc.) were pulverized and mixed together to obtain a seasoning powder of the present invention. A Chinese cabbage pickle was prepared a using the thus obtained seasoning powder (Test group 3). A white rape was cut into bite-size pieces and then placed in a polyvinyl bag, and an 8% (w/w) aqueous solution of the seasoning powder of the present invention was added thereto in a ratio of 50 parts by weight based on 100 parts by weight of Chinese cabbage. Next, the bag was squeezed to such an extent that the cut Chinese cabbage pieces were lightly soaked in the aqueous solution while the deaeration was conducted, and the pickle preparation was conducted by placing the squeezed bag at 5° C. for 16 hours. In this connection, there was similarly prepared a Chinese cabbage pickle using 8% aqueous sodium chloride solution (Test group 1) as well as 4% sodium chloride/4% potassium chloride mixed aqueous solution (Test group 2) in place of the 8% aqueous solution of the seasoning powder of the present invention, and a comparison evaluation was made with ten taste panelists. The evaluation was conducted over a 5-grade evaluation of from −2 (very weak or not very preferable) to +2 (very strong or very preferable). The results of the sensory evaluation are shown in table 9.

While the Chinese cabbage pickle of the present invention (Test group 3) is slightly inferior in the preference of the total taste and flavor in comparison with that of sodium chloride-using group (Test group 1) it was proved to have significantly appreciable mitigation effect on the bitter taste and harsh taste and received a higher score in the preference of the whole taste and flavor in comparison with that of sodium chloride/potassium chloride-using group (Test group 2). These results show that there can be provided a Chinese cabbage pickle having a good taste even when the amount of sodium chloride is reduced.

TABLE 9

| Evaluation item (−2 to +2 points) | Test group 1 (NaCl-using group) | Test group 2 (NaCl/KCl-using group) | Test group 3 (Seasoning agent of the present invention-using group) |
|---|---|---|---|
| Strength of salty taste | 1.50 | 1.50 | 0.67 |
| Preference of salty taste | 1.33 | −0.67 | 0.67 |
| Strength of bitter taste | −1.00 | 1.17 | −0.83 |
| Strength of harsh taste | −1.00 | 1.17 | −0.83 |
| Preference of flavor | 0.83 | −0.67 | 0.67 |
| Preference of the whole taste | 1.50 | −1.00 | 0.67 |

Example 4

A cucumber pickle using the seasoning powder obtained in Example 3 was prepared (Test group 3). A cucumber was cut into random-size pieces and then placed in a polyvinyl bag, and a 8% (w/w) aqueous solution of seasoning powder of the present invention was added thereto in a ratio of 40 parts by weight based on 100 parts by weight of cucumber. Next, the bag was squeezed to such an extent that the cut cucumber was lightly soaked in the aqueous solution while the deaeration was conducted, and the pickle preparation was conducted by placing the squeezed bag at 5 • for 16 hours. In this connection, there was similarly prepared a fresh cucumber pickle using a 8% aqueous sodium chloride solution (Test group 1) as well as a 4% sodium chloride/4% potassium chloride mixed aqueous solution (Test group 2) in place of the 8% aqueous solution of the seasoning powder of the present invention, and the comparison evaluation was made with ten taste panelists. The evaluation was conducted over a 5-grade evaluation of from −2 (very weak or not very preferable) to +2 (very strong or very preferable). The results of the sensory evaluation are shown in table 10.

While the cucumber pickle of the present invention (Test group 3) is slightly inferior in the preference of the total taste and flavor in comparison with that of sodium chloride-using group (Test group 1), it was shown to have significantly appreciable mitigation effect on the bitter taste and harsh taste and received a higher score in the preference of the whole taste and flavor in comparison with that of sodium chloride/potassium chloride-using group (Test group 2). These results show that there can be provided a fresh cucumber pickle having a good taste even when the amount of sodium chloride is reduced.

TABLE 10

| Evaluation item (−2 to +2 points) | Test group 1 (NaCl-using group) | Test group 2 (NaCl/KCl-using group) | Test group 3 (Seasoning agent of the present invention-using group) |
|---|---|---|---|
| Strength of salty taste | 2.00 | 1.67 | 1.00 |
| Preference of salty taste | 1.00 | −0.17 | 0.83 |
| Strength of bitter taste | −1.00 | 1.00 | −0.20 |
| Strength of harsh taste | −1.00 | 1.00 | −0.16 |
| Preference of flavor | 1.17 | −0.33 | 1.00 |
| Preference of the whole taste | 0.83 | −1.00 | 0.67 |

Example 5

A cabbage pickle using the seasoning powder obtained in Example 3 was prepared (Test group 3). Cabbage was cut into bite-size pieces and then placed in a polyvinyl bag, and a 8% (w/w) aqueous solution of seasoning powder of the present invention was added thereto in a ratio of 60 parts by weight based on 100 parts by weight of cabbage. Next, the bag was squeezed to such an extent that the cut cabbage was lightly soaked in the aqueous solution while the deaeration was conducted, and the pickle preparation was conducted by placing the squeezed bag at 5° C. for 16 hours. In this connection, there was similarly prepared a cabbage pickle with an 8% aqueous sodium chloride solution (Test group 1) as well as a 4% sodium chloride/4% potassium chloride mixed aqueous solution (Test group 2) in place of the 8% aqueous solution of the seasoning powder of the present invention, and the comparison evaluation was made with ten taste panelists. The evaluation was conducted over a 5-grade evaluation of from −2 (very weak or not very preferable) to +2 (very strong or very preferable). The results of the sensory evaluation are shown in table 11.

While the cabbage pickle of the present invention (Test group 3) is slightly inferior in the preference of the total taste and flavor in comparison with that of sodium chloride-using group (Test group 1), it was found to have significantly appreciable mitigation effect on the bitter taste and harsh taste and received a higher score in the preference of the whole taste and flavor in comparison with that of sodium chloride/potassium chloride-using group (Test group 2). These results show that there can be provided a fresh cabbage pickle having a good taste even when the amount of sodium chloride is reduced.

TABLE 11

| Evaluation item (−2 to +2 points) | Test group 1 (NaCl-using group) | Test group 2 (NaCl/KCl-using group) | Test group 3 (Seasoning agent of the present invention-using group) |
|---|---|---|---|
| Strength of salty taste | 1.17 | 0.75 | 0.50 |
| Preference of salty taste | 0.83 | 0.17 | 0.50 |
| Strength of bitter taste | −1.00 | −0.17 | −0.83 |
| Strength of harsh taste | −1.00 | −0.17 | −0.83 |
| Preference of flavor | 1.50 | 0.17 | 1.33 |
| Preference of the whole taste | 1.50 | 0.00 | 0.83 |

Example 6

A fried potato using the seasoning powder obtained in Example 3 was prepared (Test group 3). A commercially sold frozen potato stick was fried at 180 • for 3 minutes to prepare a fried potato. The obtained fried potato was placed in a polyvinyl bag, and the seasoning powder of the present invention was added thereto in a ratio of 1.5 parts by weight based on 100 parts by weight of the fried potato. In this connection, there was similarly prepared a fried potato with sodium chloride powder (Test group 1) as well as sodium chloride/potassium chloride mixed powder (1:1 ratio by weight) (Test group 2) in place of the seasoning powder of the present invention, and a comparison evaluation was made with ten taste panelists. The evaluation was conducted over a 5-grade evaluation of from −2 (very weak or not very preferable) to +2 (very strong or very preferable). The results of sensory evaluation are shown in table 12.

While the fried potato of the present invention (Test group 3) is slightly inferior in the preference of the total taste and flavor in comparison with that of sodium chloride-using group (Test group 1), it was found to have a significantly appreciable mitigation effect on the bitter taste and harsh taste and received a higher score in the preference of the whole taste and flavor in comparison with that of sodium chloride/potassium chloride-using group (Test group 2). These results show that there can be provided the fried potato having a good taste even when the salt of sodium chloride is reduced.

TABLE 12

| Evaluation item (−2 to +2 points) | Test group 1 (NaCl-using group) | Test group 2 (NaCl/KCl-using group) | Test group 3 (Seasoning agent of the present invention-using group) |
|---|---|---|---|
| Strength of salty taste | 1.33 | 1.07 | 0.77 |
| Preference of salty taste | 1.67 | 0.67 | 0.83 |
| Strength of bitter taste | −0.83 | 0.50 | −0.40 |
| Strength of harsh taste | −0.83 | 0.33 | −0.40 |
| Preference of flavor | 1.50 | 0.30 | 0.83 |
| Preference of the whole taste | 1.17 | −0.33 | 0.50 |

Effect of the Invention:

As explained above, there can be provided a seasoning composition which can reduce the amount of salt and impart a good taste to food by blending 100 parts by weight of potassium chloride with 0.2–5 parts by weight of a sugar alcohol, 1–7.5 parts by weight of sodium glutamate, 1–10 parts by weight of sucrose and 0.05–1 part by weight of sodium inosinate and/or sodium guanylate. Also, there can be provided low salt food having a good taste by using the above seasoning composition.

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

What is claimed is:

1. A seasoning composition, comprising:
   (a) 100 parts by weight of potassium chloride;
   (b) 0.2 to 5 parts by weight of a sugar alcohol;
   (c) 1 to 7.5 parts by weight of sodium glutamate (in terms of anhydride);
   (d) 1 to 10 parts by weight of sucrose; and
   (e) 0.05 to 1 part by weight of an ingredient selected from the group consisting of sodium inosinate, sodium guanylate, and mixtures thereof (in terms of anhydride).

2. The seasoning composition of claim 1, comprising:
   (a) 100 parts by weight of potassium chloride;
   (b) 0.3 to 3.5 parts by weight of a sugar alcohol;
   (c) 2 to 5 parts by weight of sodium glutamate (in terms of anhydride);
   (d) 2 to 5 parts by weight of sucrose; and
   (e) 0.1 to 0.5 part by weight of an ingredient selected from the group consisting of sodium inosinate, sodium guanylate, and mixtures thereof (in terms of anhydride).

3. The seasoning composition of claim 1, wherein said sugar alcohol is selected from the group consiting of sorbitol, maltitol, palatinitol, mannitol, xylitol, hydrogenated materials derived from partial decomposition product of starch, and mixtures thereof.

4. The seasoning composition of claim 1, wherein said sodium glutamate is a monohydrate.

5. The seasoning composition of clam 1, wherein said sucrose is selected from the group consisting of granulated sugar, refined sugar, soft sugar (yellow sugar), raw sugar (brown sugar), and mixtures thereof.

6. The seasoning composition of claim 1, wherein said sodium inosinate is a 7.5 hydrate.

7. A method for seasoning food, said method comprising adding to food an effective amount of a seasoning composition, said seasoning composition comprising:
   (a) 100 parts by weight of potassium chloride;
   (b) 0.2 to 5 parts by weight of a sugar alcohol;
   (c) 1 to 7.5 parts by weight of sodium glutamate (in terms of anhydride);
   (d) 1 to 10 parts by weight of sucrose; and
   (e) 0.05 to 1 part by weight of an ingredient selected from the group consisting of sodium inosinate, sodium guanylate, and mixtures thereof (in terms of anhydride).

8. The method of claim 7, wherein said seasoning composition comprises:
   (a) 100 parts by weight of potassium chloride;
   (b) 0.3 to 3.5 parts by weight of a sugar alcohol;
   (c) 2 to 5 parts by weight of sodium glutamate (in terms of anhydride);
   (d) 2 to 5 parts by weight of sucrose; and
   (e) 0.1 to 0.5 part by weight of an ingredient selected from the group consisting of sodium inosinate, sodium guanylate, and mixtures thereof (in terms of anhydride).

9. The method of claim 7, wherein said sugar alcohol is selected from the group consiting of sorbitol, maltitol, palatinitol, mannitol, xylitol, hydrogenated materials derived from partial decomposition product of starch, and mixtures thereof.

10. The method of claim 7, wherein said sodium glutamate is a monohydrate.

11. The method of clam 7, wherein said sucrose is selected from the group consisting of granulated sugar, refined sugar, soft sugar (yellow sugar), raw sugar (brown sugar), and mixtures thereof.

12. The method of claim 7, wherein said sodium inosinate is a 7.5 hydrate.

13. The method of claim 7, wherein said food is selected from the group consisting of meat, vegetables, fruits, grains, prepared foods, and snack foods.

14. A seasoned food, comprising a food seasoned with a seasoning composition, said seasoning composition comprising:
   (a) 100 parts by weight of potassium chloride;
   (b) 0.2 to 5 parts by weight of a sugar alcohol;
   (c) 1 to 7.5 parts by weight of sodium glutamate (in terms of anhydride);
   (d) 1 to 10 parts by weight of sucrose; and
   (e) 0.05 to 1 part by weight of an ingredient selected from the group consisting of sodium inosinate, sodium guanylate, and mixtures thereof (in terms of anhydride).

15. The seasoned food of claim 14, comprising:
   (a) 100 parts by weight of potassium chloride;
   (b) 0.3 to 3.5 parts by weight of a sugar alcohol;
   (C) 2 to 5 parts by weight of sodium glutamate (in terms of anhydride);
   (d) 2 to 5 parts by weight of sucrose; and
   (e) 0.1 to 0.5 part by weight of an ingredient selected from the group consisting of sodium inosinate, sodium guanylate, and mixtures thereof (in terms of anhydride).

16. The seasoned food of claim 14, wherein said sugar alcohol is selected from the group consiting of sorbitol, maltitol, palatinitol, mannitol, xylitol, hydrogenated materials derived from partial decomposition product of starch, and mixtures thereof.

17. The seasoned food of claim 14, wherein said sodium glutamate is a monohydrate.

18. The seasoned food of claim 14, wherein said sucrose is selected from the group consisting of granulated sugar, refined sugar, soft sugar (yellow sugar), raw sugar (brown sugar), and mixtures thereof.

19. The seasoned food of claim 14, wherein said sodium inosinate is a 7.5 hydrate.

20. The seasoned food of claim 14, wherein said food is selected from the group consisting of meat, vegetables, fruits, grains, prepared foods, and snack foods.

* * * * *